(12) United States Patent
Birnie

(10) Patent No.: US 8,928,600 B2
(45) Date of Patent: Jan. 6, 2015

(54) TRANSACTION TERMINAL

(75) Inventor: Steven Birnie, Angus (GB)

(73) Assignee: NCR Corporation, Duluth, GA (US)

( * ) Notice: Subject to any disclaimer, the term of this patent is extended or adjusted under 35 U.S.C. 154(b) by 524 days.

(21) Appl. No.: 12/903,241

(22) Filed: Oct. 13, 2010

(65) Prior Publication Data

US 2012/0095851 A1  Apr. 19, 2012

(51) Int. Cl.
  *G06Q 20/20* (2012.01)
  *G07F 19/00* (2006.01)

(52) U.S. Cl.
  CPC .............. *G06Q 20/20* (2013.01); *G06Q 20/208* (2013.01); *G07F 19/201* (2013.01)
  USPC ........................................................ 345/173

(58) Field of Classification Search
  CPC .............................. G06Q 20/20; G06Q 20/208
  USPC ........................................................ 345/173
  See application file for complete search history.

(56) References Cited

U.S. PATENT DOCUMENTS

2010/0066689 A1 * 3/2010 Jung et al. ..................... 345/173

* cited by examiner

*Primary Examiner* — Shay S Glass
(74) *Attorney, Agent, or Firm* — Paul W. Martin

(57) ABSTRACT

A transaction terminal which includes a projector instead of a liquid crystal display. The transaction terminal includes a projector for projecting images of transaction screens on a surface during a transaction, an input device for recording operator selections in the transaction screens during the transaction, and a computer for generating the images of the transaction screens, for displaying the screens via the projector, and for processing the operator selections during the transaction.

6 Claims, 2 Drawing Sheets

TRANSACTION TERMINAL

BACKGROUND

One of the most costly elements of transaction terminal is the display. Displays are usually the main point of interaction by an operator. Displays sit in and upright and prominent position in front of an operator. Typical displays are liquid crystal displays, which come in various sizes.

In a transaction environment, such as a retail store, this position obscures the operator's view of views of the operator by others. This position is also inefficient because it requires the operator to change focus between the display and other transaction components.

It would be desirable to provide a transaction terminal that addresses these concerns.

SUMMARY

A transaction terminal is provided.

A transaction terminal which includes a projector instead of a liquid crystal display. The transaction terminal includes a projector for projecting images of transaction screens on a surface during a transaction, an input device for recording operator selections in the transaction screens during the transaction, and a computer for generating the images of the transaction screens, for displaying the screens via the projector, and for processing the operator selections during the transaction.

An example transaction method includes generating images of transaction screens during a transaction by a computer, projecting the images of the transaction screens in a section of a top surface of an item identification unit by a projector on a side of the item identification unit opposite an operator side of the item identification unit, recording operator selections in the transaction screens by an input device on the top surface of the item identification unit, and processing the operator selections by the computer.

DETAILED DESCRIPTION

Figure 1:
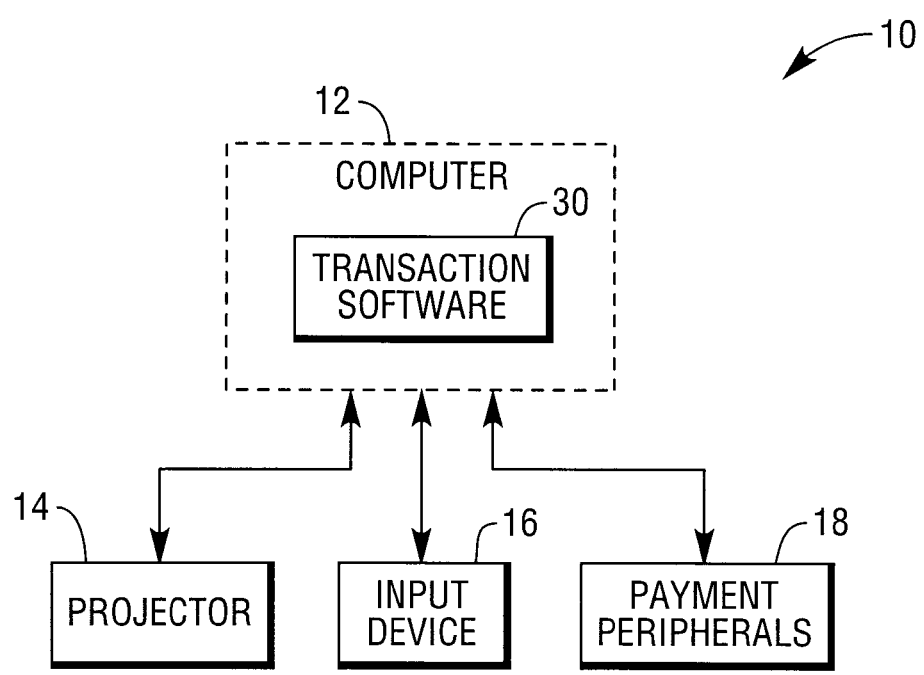
FIG. 1 is a block diagram of an example transaction terminal.

With reference to FIG. 1, example transaction terminal 10 includes computer 12, projector 14, input device 16, and transaction peripherals 18.

Computer 12 includes a processor, memory, program and data storage. Computer 12 may execute an operating system such as a Microsoft operating system, which can display screen information within one or more windows.

Computer 12 executes transaction software 30, which displays images of screens and records operator selections from those screens.

Projector 14 projects images of transaction screens on a projection surface. The projection surface may include a surface of transaction terminal 10 or a separate surface.

Input device 16 records operator selections during a transaction. Input device 16 may include a touch sensitive device or a keyboard. Input device 16 may occupy or overlap the same surface upon which projector 14 projects images or may occupy a different surface.

Transaction terminal 10 may include a self-service computer or an assisted-service computer.

For example, transaction terminal 10 may include, but not be limited to, a self-service or assisted-service terminal in a retail store, a travel kiosk at an airport, a quick service or pre-order pre-pay kiosk in a restaurant.

Transaction terminal 10 additionally includes transaction peripherals 18 necessary to accomplish its purpose for the environment it is in. For example, transaction terminal 10 may additionally include, but not be limited to, any of the following: one or more payment peripherals, a printer, an item identification unit such as a barcode reader or a radio frequency identification (RFID) tag reader or a produce recognition unit, a scale, a cash money drawer, a biometric reader, a signature capture unit, a passport reader, and an electronic item surveillance (EAS) tag sense and deactivation unit.

For example, the payment peripherals may include one or more of a card reader for reading credit, debit, and/or loyalty cards; a currency acceptor; a currency dispenser; a coin acceptor; and a coin dispenser.

The printer may print a receipt, coupons, and other promotions.

The item identification unit may capture identification information in the form of a barcode or RFID tag identifier from items. The item identification unit may additionally or alternatively capture information from produce items.

The biometric reader may capture information from operators themselves, such as fingerprints.

The signature capture unit may capture an operator signature to be stored with a record of a transaction.

The passport reader may capture information from operator passports through optical character recognition and/or from electronic chips in the passports.

The EAS tag sense and deactivation unit may identify security tags on products and deactivate them following purchase.

Figure 2:
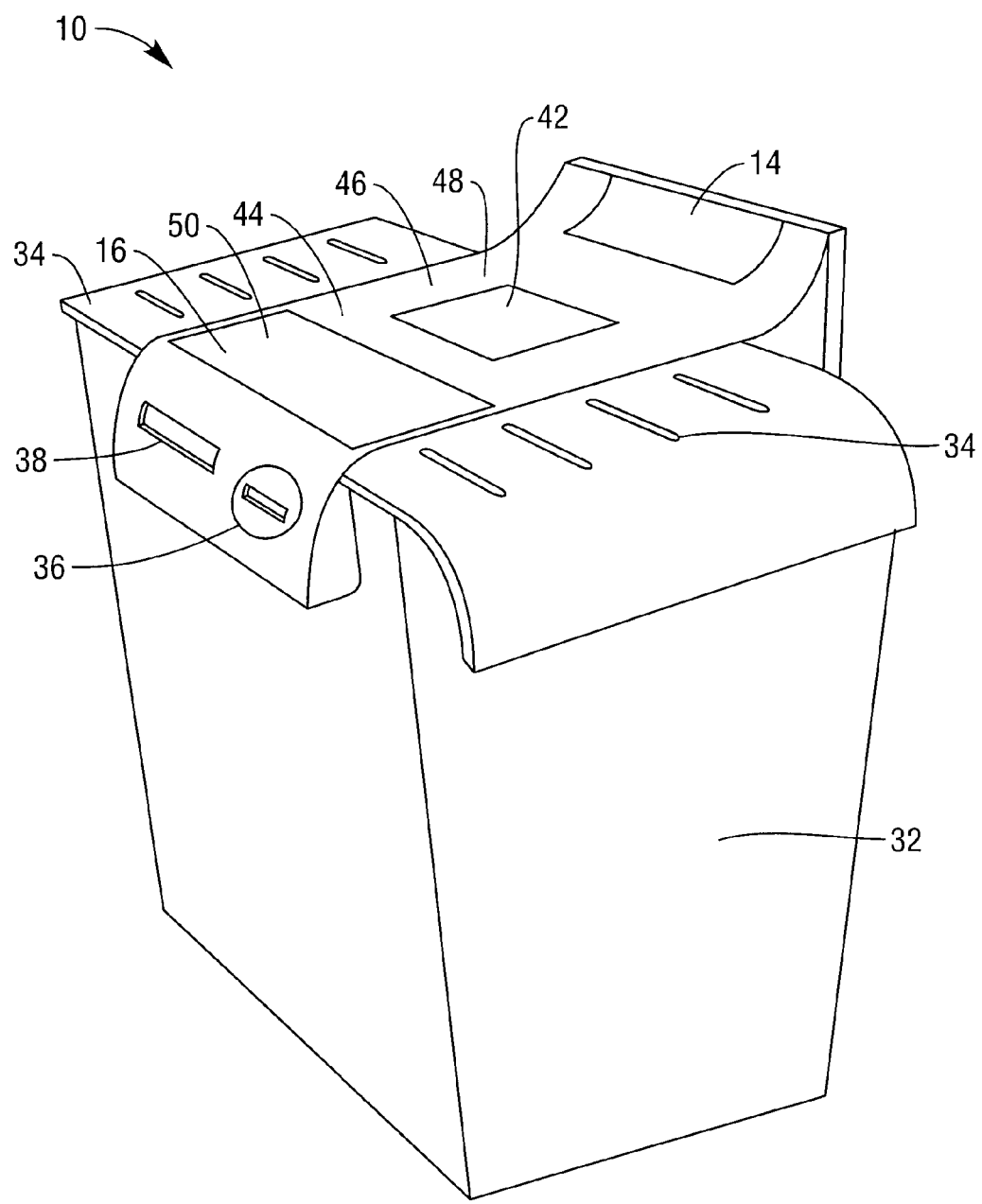
FIG. 2 is an illustration of an example transaction terminal.

Referring now to FIG. 2, an example transaction terminal 10 includes checkstand 32 with product placement shelves 34 on either side of item identification unit 44. An operator side includes a card reader 36 and printer 38. An opposite side includes projector 14.

Item identification unit 44 includes a barcode reader with integrated scale 46 and horizontal weigh plate 48. Weigh plate 48 includes horizontal window 42 through which scanning components within the barcode reader can read barcode labels on purchased items. The barcode reader may include any combination of an optical barcode reader which generates scanning light beams and an imaging barcode reader which captures images of barcodes using a camera element. The barcode reader is illustrated as having a single window 42, but may include additional windows. For example, the barcode reader may include a vertical tower portion with a vertically oriented window facing the operator. Projector 14 may be mounted on top of the vertical tower portion.

Weigh plate 48 further includes a defined area 50 on the operator side containing input device 16. Area 50 also serves as a projection surface where projector 14 projects images of transaction screens.

Locating input device 16 and display area 50 on item identification unit 44 focuses operator attention.

The fact that area 50 is horizontal and the projection angle from projector 14 is low, less than about thirty degrees, provides increased operator privacy over a vertically oriented liquid crystal display.

Projector 14 may be mounted to item identification unit 44 or integrated into item identification unit. Since projector 14 replaces a traditional liquid crystal display located above item identification unit 44, the operator has better visibility and is not obscured.

In operation, projector 14 projects images of transaction screens within area 50 of weigh plate 48.

An operator makes a selection in a first transaction screen to begin a new transaction. A self-service operator may also insert a loyalty card.

Transaction software 30 displays subsequent screens that guide the operator through the transaction. Input device 16 records operator selections during the transaction. As the operator presents items to item identification unit 44, transaction software 30 displays item identification information and price information. Screens may include images of items that have been identified.

When the operator has scanned the last item, transaction software 30 displays payment instructions and processes payment information from card reader 36. Transaction software 30 then generates a receipt and activates printer 38 to print the receipt.

Although particular reference has been made to certain embodiments, variations and modifications are also envisioned within the spirit and scope of the following claims.

What is claimed is:

1. A transaction terminal comprising:
    an item identification unit, including a barcode reader, for identifying items for purchase during a transaction, the item identifying unit having a substantially horizontal surface and a substantially vertical surface and having an operator side and a projector side;
    a display section on the operator side of the substantially horizontal surface;
    a projector on the projector side for projecting images of transaction screens from the substantially vertical surface at a downward angle towards the display section of the substantially horizontal surface from above the substantially horizontal surface during the transaction, the transaction including information for guiding an operator through the transaction;
    an input device adjacent the display section for recording operator selections in the transaction screens during the transaction;
    a payment peripheral on the operator side for accepting payment for the items during the transaction; and
    a computer for generating the images of the transaction screens, for displaying the screens in the display section via the projector, and for processing barcode information from the items, the payment for the items, and the operator selections via the input device during the transaction.

2. The transaction terminal of claim 1, wherein the projector projects the images at less than about a thirty degree angle relative to the substantially horizontal surface.

3. The transaction terminal of claim 1, further comprising a checkstand supporting the item identification unit.

4. The transaction terminal of claim 3, further comprising product placement shelves on left and right sides of the item identification unit.

5. The transaction terminal of claim 1, wherein the input device comprises a touch sensitive input device overlapping the display section.

6. A transaction method comprising:
    generating images of transaction screens containing information for guiding an operator through a transaction by a computer;
    projecting the images of the transaction screens at a downward angle towards a display section of a substantially horizontal surface of an item identification unit by a projector from a substantially vertical surface on a projector side of the item identification unit opposite an operator side of the item identification unit;
    identifying items for purchase during the transaction by the item identification unit including reading barcodes on the items;
    recording operator selections in the transaction screens by an input device adjacent the display section of the item identification unit; and
    processing item identification information from the barcodes and the operator selections by the computer.

* * * * *